(12) United States Patent
Minamiyama

(10) Patent No.: US 11,526,311 B2
(45) Date of Patent: Dec. 13, 2022

(54) COMMUNICATION SYSTEM, PRINTER, METHOD EXECUTED BY COMMUNICATION SYSTEM AND NON-TRANSITORY COMPUTER-READABLE RECORDING MEDIUM STORING COMPUTER-READABLE INSTRUCTIONS FOR PRINTER

(71) Applicant: BROTHER KOGYO KABUSHIKI KAISHA, Nagoya (JP)

(72) Inventor: Yukinori Minamiyama, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/198,452

(22) Filed: Mar. 11, 2021

(65) Prior Publication Data
US 2021/0303238 A1    Sep. 30, 2021

(30) Foreign Application Priority Data
Mar. 30, 2020    (JP) .............................. JP2020-061169

(51) Int. Cl.
G06F 3/12    (2006.01)
B41J 2/175    (2006.01)

(52) U.S. Cl.
CPC .......... *G06F 3/1231* (2013.01); *B41J 2/1752* (2013.01); *B41J 2/17543* (2013.01); *G06F 3/1203* (2013.01); *G06F 3/1219* (2013.01); *G06F 3/1289* (2013.01)

(58) Field of Classification Search
None
See application file for complete search history.

(56) References Cited

U.S. PATENT DOCUMENTS

| 10,681,241 B2 * | 6/2020 | Takenaka ............ H04N 1/00344 |
| 2015/0222784 A1 * | 8/2015 | Ando ....................... H04N 1/21 |
| | | 358/1.15 |
| 2016/0292550 A1 | 10/2016 | Kawai | |

FOREIGN PATENT DOCUMENTS

| JP | 2016-193592 A | 11/2016 |
| JP | 2017191402 A | * 10/2017 |

* cited by examiner

*Primary Examiner* — Fan Zhang
(74) *Attorney, Agent, or Firm* — Merchant & Gould P.C.

(57) ABSTRACT

A communication system may include a printer and a terminal device. The printer may, in a case where a predetermined operation is accepted, execute a communication process and, in a case where sending of start information to a server fails in the communication process, execute an output process for causing an output unit to output communication information for communicating with the server and start related information obtained by using the start information. The terminal device may obtain the communication information and the start related information outputted by the printer and, in a case where the communication information and the start related information are obtained, send the start related information to the server using the communication information.

20 Claims, 10 Drawing Sheets

COMMUNICATION SYSTEM, PRINTER, METHOD EXECUTED BY COMMUNICATION SYSTEM AND NON-TRANSITORY COMPUTER-READABLE RECORDING MEDIUM STORING COMPUTER-READABLE INSTRUCTIONS FOR PRINTER

CROSS-REFERENCE TO RELATED APPLICATION

This application claims priority to Japanese Patent Application No. 2020-061169, filed on Mar. 30, 2020, the entire contents of which are hereby incorporated by reference into the present application.

TECHNICAL FIELD

The present disclosure discloses a technique for causing a server to start a service relating to a printer.

BACKGROUND ART

A communication system comprising a printer, a PC, an information management server, and a delivery management server is known. When a flat-rate print processing contract is signed between a user of the printer and a manufacturer providing a flat-rate print processing service, the delivery management server ships, to the user of the printer, a dedicated cartridge to be used in the flat-rate print processing. Then, when the dedicated cartridge is attached, the printer determines whether the printer can communicate with the information management server. In a case of determining that the printer can communicate with the information management server, the printer sends start information to the information management server. On the other hand, in a case of determining that the printer cannot communicate with the information management server, the printer waits until the printer can communicate with the information management server. When receiving the start information from the printer, the information management server starts the flat-rate print processing service.

SUMMARY

In the above communication system, in the case where the printer and the information management server cannot communicate with each other, the information management server cannot start the flat-rate print processing service until the printer and the information management server can communicate.

The present disclosure provides a technique allowing a server to start a service relating to a printer even when the printer and the server cannot communicate with each other.

A communication system disclosed herein may comprise: a printer; and a terminal device. The printer may comprise: an output unit; and a controller configured to: in a case where a predetermined operation is accepted, execute a communication process, the communication process including a process for sending start information to a server, the start information being for causing the server to start a service related to the printer; and in a case where sending of the start information to the server fails in the communication process, execute an output process for causing the output unit to output communication information for communicating with the server and start related information obtained by using the start information. The terminal device may comprise: a controller configured to: obtain the communication information and the start related information outputted by the printer; and in a case where the communication information and the start related information are obtained, send the start related information to the server using the communication information.

In addition, a printer disclosed in the disclosure may comprise: an output unit; and a controller configured to: in a case where a first predetermined operation is accepted, execute a communication process, the communication process including a process for sending start information to a server, the start information being for causing the server to start a service related to the printer; and in a case where sending of the start information to the server fails in the communication process, execute an output process for causing the output unit to output communication information for communicating with the server and start related information obtained by using the start information.

A method implemented by the above communication system is also novel and useful. A computer program for implementing the above printer, and a computer-readable recording medium storing the computer program are also novel and useful. Moreover, a method implemented by the above printer is also novel and useful.

EMBODIMENTS

Figure 1:
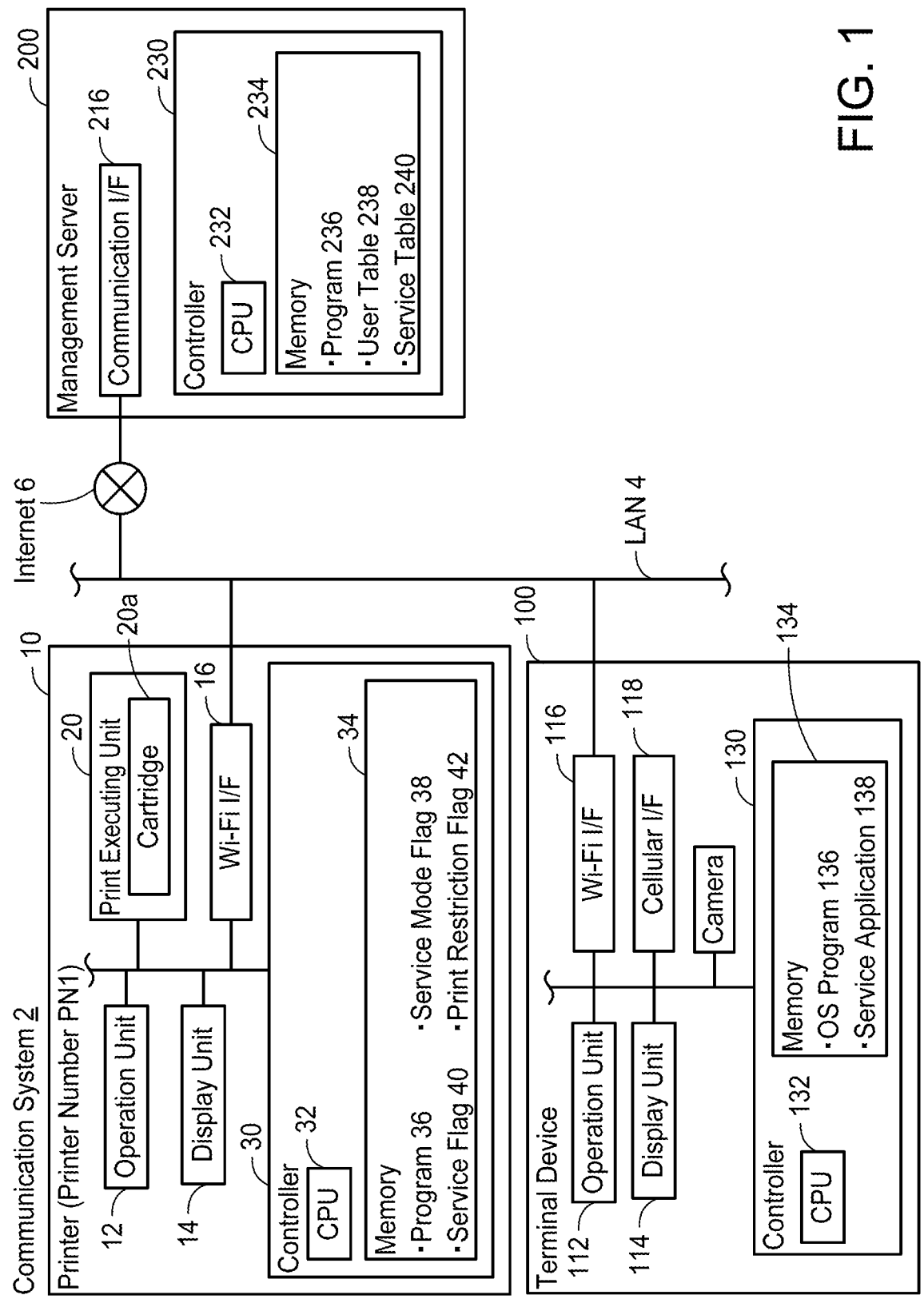
FIG. 1 shows a configuration of a communication system.

First Embodiment (Configuration of Communication System 2; FIG. 1)
As shown in FIG. 1, a communication system 2 includes a printer 10, a terminal device 100, and a management server 200 (hereinbelow termed "server 200"). The printer 10 and the terminal device 100 are connected with a LAN (Local Area Network) 4. The LAN 4 is connected with the Internet 6. The printer 10 and the terminal device 100 are configured to communicate with each other via the LAN 4. The server 200 is connected with the Internet 6. The printer 10, the terminal device 100, and the server 200 are configured to communicate with each other via the Internet 6. The server 200 provides a charging service that charges in accordance with the number of sheets printed by the printer 10.

(Configuration of Printer 10)
The printer 10 is a peripheral device (e.g., a peripheral device of a PC, etc.) configured to execute a print function.

The printer 10 may be a multi-function device configured to execute a scan function, a FAX function, etc. in addition to the print function. The printer 10 includes an operation unit 12, a display unit 14, a Wi-Fi interface (hereinbelow, interface is termed "I/F") 16, a print executing unit 20, and a controller 30. A printer number PN1 is assigned to the printer 10. The printer number is a unique character string assigned to each printer when a plurality of printers is manufactured.

The operation unit 12 includes a plurality of keys. A user can input various instructions to the printer 10 by operating the operation unit 12. The display unit 14 is a display for displaying various types of information.

The Wi-Fi I/F 16 is a wireless interface for executing wireless communication according to a Wi-Fi scheme. The Wi-Fi scheme is, e.g., a wireless communication scheme for executing wireless communication according to 802.11 standard of the Institute of Electrical and Electronics Engineers, Inc. (IEEE) and standards complying thereto (e.g., 802.11a, 11b, 11g, 11n, 11ac, etc.).

The print executing unit 20 is an ink jet scheme printing mechanism. A cartridge 20a for housing ink is attached to the print executing unit 20. The print executing unit 20 executes printing by using the ink in the cartridge 20a. A cartridge number for identifying the cartridge 20a is assigned to the cartridge 20a. The cartridge number is a unique character string assigned to each cartridge when a plurality of cartridges is manufactured. Moreover, cartridges include a dedicated cartridge that can be used only when a charging service is provided and a general cartridge that can be used when the charging service is not provided. The cartridge 20a is a general cartridge.

The controller 30 includes a CPU 32 and a memory 34. The CPU 32 executes various processes in accordance with a program 36 stored in the memory 34. The memory 34 is constituted of a volatile memory, a non-volatile memory, or the like. The memory 34 further stores a service mode flag 38, a service flag 40, and a print restriction flag 42.

The service mode flag 38 indicates either value of "ON", indicating that execution of a first service start process to be described (FIG. 5) is permitted, or "OFF", indicating that execution of the first service start process is prohibited. The service flag 40 indicates either value of "ON", indicating that the server 200 has started the charging service, or "OFF", indicating that the server 200 has not started the charging service. The print restriction flag 42 indicates either value of "ON", indicating that printing by the print executing unit 20 is restricted, or "OFF", indicating that printing by the print executing unit 20 is not restricted.

(Configuration of Terminal Device 100)

The terminal device 100 is a portable device such as a cellphone, a smartphone, a PDA, a portable music player, a portable video player, etc. The terminal device 100 includes an operation unit 112, a display unit 114, a Wi-Fi OF 116, a cellular I/F 118, a camera 120, and a controller 130.

The operation unit 112 includes a plurality of keys. The user can input various instructions to the terminal device 100 by operating the operation unit 112. The display unit 114 is a display for displaying various types of information. The display unit 114 also functions as a so-called touch screen (i.e., operation unit). The Wi-Fi I/F 116 is the same as the Wi-Fi I/F 16 of the printer 10.

The cellular I/F 118 is a wireless interface for executing cellular communication according to a cellular scheme. The cellular scheme is a wireless communication scheme in which an area is divided into fixed sections (i.e., cells), and a base station located in each cell is used. The cellular scheme includes 3G, 4G, 5G, etc. defined by the International Telecommunication Union.

The camera 120 is a device for capturing an object and, in the present embodiment, is particularly used for capturing a QR code (registered trademark) displayed on the display unit 14 of the printer 10.

The controller 130 includes a CPU 132 and a memory 134. The CPU 132 executes various processes in accordance with an OS (Operating System) program 136 stored in the memory 134. The OS program 136 is a program for controlling various basic operations of the terminal device 100. Further, the memory 134 stores a service application 138. The service application 138 is an application used for receiving the charging service provided from the server 200 and is installed on the terminal device 100 from, e.g., a server on the Internet 6.

(Configuration of Server 200)

The server 200 is installed on the Internet 6 by a vendor of the printer 10. In a variant, the server 200 may be installed on the Internet 6 by a business operator different from the aforementioned vendor. The server 200 provides a flat-rate charging service (termed "flat-rate service" below), and a usage-based charging service (termed "usage-based service" below). The flat-rate service is a service in which a predetermined amount of money is paid in a case where the number of printed sheets in a predetermined period (e.g., one month) is less than or equal to a predetermined number of sheets (e.g., 1000 sheets). The usage-based service is a service in which an amount of money is paid depending on the number of printed sheets in a predetermined period (e.g., one month).

The server 200 includes a communication I/F 216 and a controller 230. The communication I/F 216 is connected with the Internet 6. The communication I/F 216 is a wireless interface configured to execute wireless communication according to the Wi-Fi standard, and cellular communication according to the cellular scheme. The controller 230 includes a CPU 232 and a memory 234. The CPU 232 executes various processes in accordance with a program 236 stored in the memory 234. The memory 234 is constituted of a volatile memory, a non-volatile memory, or the like. The memory 234 further stores a user table 238 and a service table 240.

Figure 2:
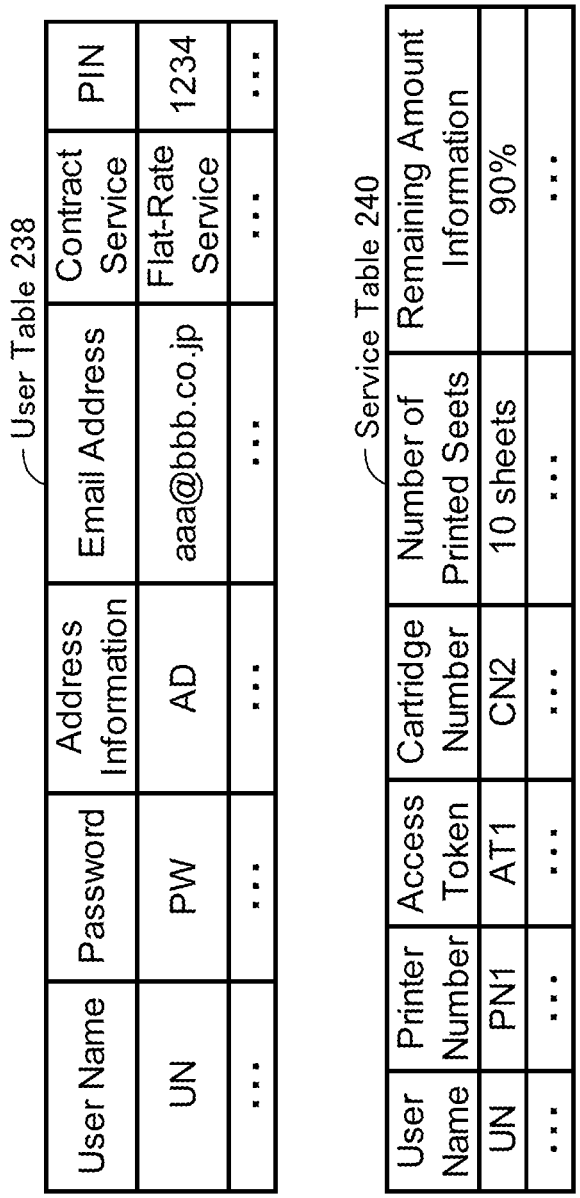
FIG. 2 shows table.

(Configuration of Tables; FIG. 2)

Next, the contents of the user table 238 and the service table 240 in the server 200 will be described with reference to FIG. 2.

One or more pieces of user information are stored in the user table 238. The user information includes a user name (e.g., UN) for identifying a user, a password (e.g., PW), address information (e.g., AD) showing an address of the user, an email address of the user (e.g., "aaa@bbb.co.jp") and a contract service into which the user has entered (e.g., flat-rate service). Further, the user table 238 can store a Personal Identification Number (PIN) code (e.g., "1234") in association with each piece of user information.

One or more pieces of service information are stored in the service table 240. The service information includes a user name (e.g., UN), a printer number (e.g., PS1), an access token (e.g., AT1), a cartridge number (e.g., CN1), the number of printed sheets, and remaining amount information showing an amount remaining in the cartridge.

Figure 3:
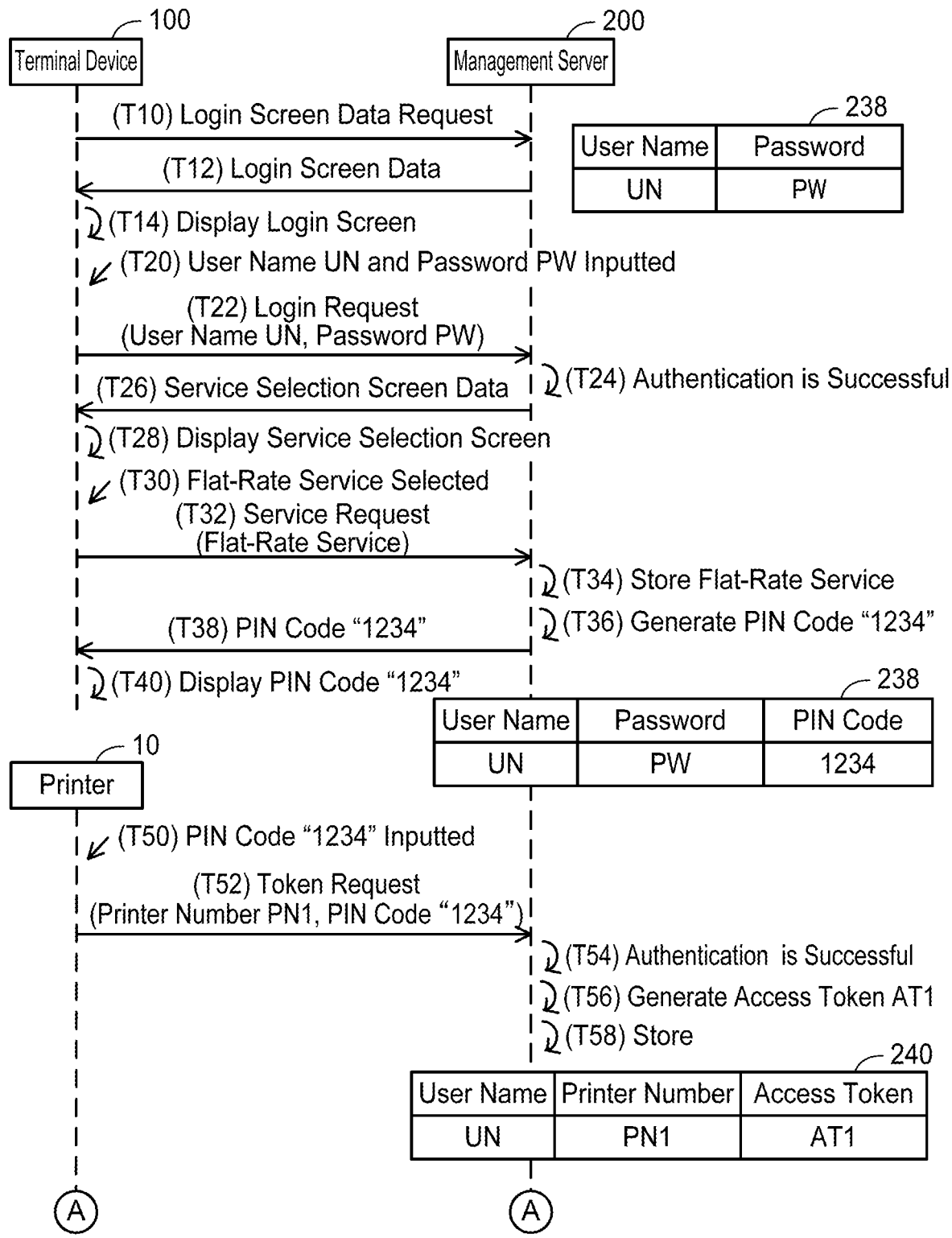
FIG. 3 shows a sequence diagram of a service preparation process.
Figure 4:
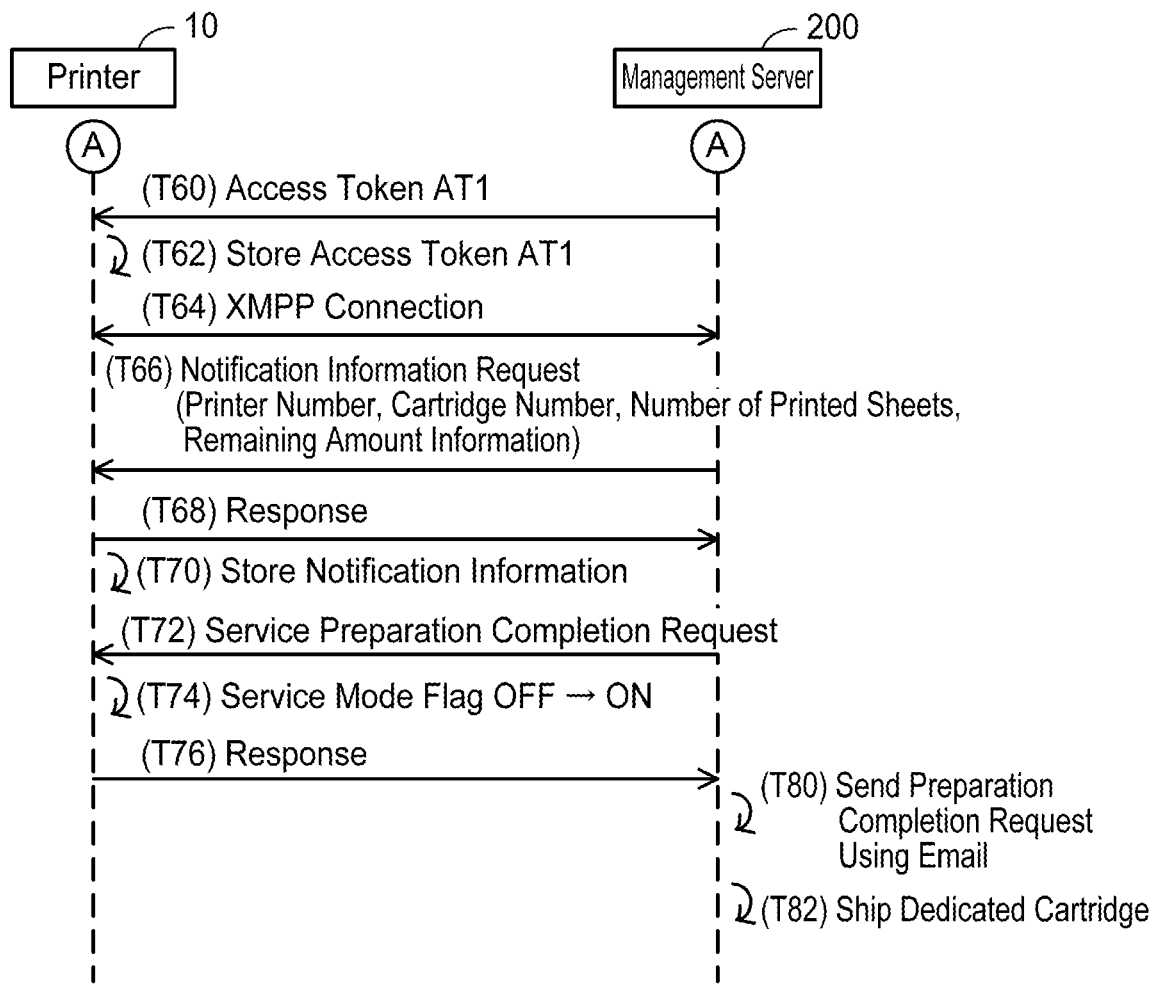
FIG. 4 shows a continuation of FIG. 3.

(Registration Process; FIG. 3, FIG. 4)

Next, a service preparation process will be described with reference to FIGS. 3 and 4. The service preparation process is a process executed in order to receive provision of the charging service. In FIGS. 3 and 4, to facilitate understanding, processes executed by the CPU of each device (e.g., the CPU 32 of the printer 10, etc.) are described with each device (e.g., the printer 10, etc.) as a subject of the processes, not with the CPU described as the subject thereof.

In an initial state of FIG. 3, the user name UN, the password PW, the address information AD, and the email address "aaa@bbb.co.jp" are stored in the user table 238 of the server 200. These pieces of information are stored in the server 200 by, e.g., the user using the terminal device 100. Further, in the initial state of FIG. 3, the service application 138 has been installed on the terminal device 100.

When accepting an access operation for accessing the server 200, the terminal device 100 sends a login screen data request to the server 200 in T10 via the Wi-Fi I/F 116.

When receiving the login screen data request from the terminal device 100 via the communication I/F 216 in T10, the server 200 sends login screen data to the terminal device 100 in T12 via the communication I/F 216.

When receiving the login screen data from the server 200 via the Wi-Fi I/F 116 in T12, the terminal device 100 displays a login screen in T14. Next, when accepting an input operation of the user name UN and the password PW in T20, the terminal device 100 sends a login request including the user name UN and the password PW to the server 200 in T22 via the Wi-Fi I/F 116.

When receiving the login request from the terminal device 100 via the communication I/F 216 in T22, the server 200 determines in T24 that authentication has succeeded because the combination of the user name UN and the password PW included in the login request is stored in the user table 238. In this case, the server 200 sends service selection screen data to the terminal device 100 in T26 via the communication I/F 216.

When receiving the service selection screen data from the server 200 via the Wi-Fi I/F 116 in T26, the terminal device 100 displays a service selection screen in T28. The service selection screen is a screen for selecting the charging service that the user desires from among the flat-rate service and the usage-based service provided by the server 200. When accepting selection of the flat-rate service in T30, the terminal device 100 sends a service request including information indicating that the flat-rate service has been selected to the server 200 in T32 via the Wi-Fi I/F 116.

When receiving the service request from the terminal device 100 via the communication I/F 216 in T32, the server 200 identifies the flat-rate service included in the service request, and stores the user name UN of the user currently logged in (may be termed "logged-in user name UN" below) and the contract service "flat-rate service" in association with one another in the user table 238 in T34. Next, the server 200 generates the PIN code "1234" in T36, stores the logged-in user name UN and the PIN code "1234" in association with one another in the user table 238, and sends the PIN code "1234" to the terminal device 100 in T38 via the communication I/F 216.

When receiving the PIN code "1234" from the server 200 via the Wi-Fi I/F 116 in T38, the terminal device 100 displays the PIN code "1234" in T40. Thereby, the user can acknowledge the PIN code "1234".

Next, when accepting input of the PIN code "1234" from the user in T50, the printer 10 sends a token request to the server 200 in T52 via the Wi-Fi I/F 16. The token request is a command for requesting the server 200 to send an access token, and includes the printer number PN1 of the printer 10 and the PIN code "1234".

When receiving the token request from the printer 10 via the communication I/F 216 in T52, the server 200 executes authentication of the PIN code "1234" included in the token request. In the present case, since the PIN code "1234" included in the token request matches the PIN code "1234" in the user table 238, the server 200 determines that authentication of the PIN code has succeeded in T54. Next, the server 200 generates an access token AT1 in T56, and stores, in the service table 240, the user name UN associated with the PIN code "1234", the printer number PN1 included in the token request, and the generated access token AT1 in association with one another in T58. In T60 of FIG. 4, the server 200 sends the access token AT1 to the printer 10 via the communication I/F 216.

When receiving the access token AT1 from the server 200 via the Wi-Fi I/F 16 in T60, the printer 10 stores the access token AT1 in the memory 34 in T62, and establishes an XMPP connection with the server 200 in T64 by using the access token AT1. The XMPP connection is a so-called constant connection, and is a connection that remains established until a power of the printer 10 is turned off. By using the XMPP connection, the server 200 can send a request to the printer 10 over the firewall of the LAN 4 to which the printer 10 belongs without receiving a request from the printer 10. A mechanism for sending a request from the server 200 to the printer 10 may be another method instead of the XMPP connection. For example, a Hypertext Transfer Protocol Secure (HTTPS) connection may be established between the printer 10 and the server 200.

When the XMPP connection is established between the printer 10 and the server 200, the server 200 sends a notification information request to the printer 10 in T66 via the communication I/F 216. The notification information request includes information necessary for the server 200 to provide the flat-rate service (i.e., printer number, cartridge number, number of printed sheets, remaining amount information).

When receiving the notification information request from the server 200 via the Wi-Fi I/F 16 in T66, the printer 10 sends a response including the access token AT1 to the server 200 in T68 via the Wi-Fi I/F 16, and stores in T70 the access token AT1 and the information in the notification information request (i.e., printer number, cartridge number, number of printed sheets, remaining amount information) in the memory 34 as notification information.

When receiving the response from the printer 10 via the communication I/F 216 in T68, the server 200 determines that the access token AT1 included in this response has already been stored in the service table 240 (i.e., authentication using the access token AT1 has succeeded), and sends a service preparation completion request to the printer 10 in T72 via the communication I/F 216.

When receiving the service preparation completion request from the server 200 via the Wi-Fi I/F 16 in T72, the printer 10 changes the service mode flag 38 from "OFF" to "ON" in T74, and sends a response including the access token AT1 to the server 200 via the Wi-Fi I/F 16 in T76.

When receiving the response from the printer 10 via the communication I/F 216 in T76, the server 200 determines that the access token AT1 included in this response has already been stored in the service table 240, identifies the user name UN associated with the access token AT1 in the service table 240, and identifies the email address "aaa@bbb.co.jp" associated with the identified user name UN in the user table 238. Next, in T80 the server 200 sends an email including a preparation completion notification to the identified email address "aaa@bbb.co.jp". Next, the server 200 identifies the address information AD associated with the identified user name UN in the user table 238, and ships a dedicated cartridge 20b to be used for receiving provision of the flat-rate service to the address indicated by the identified address information AD in T82. When T82 is completed, the service preparation process ends.

Figure 5:
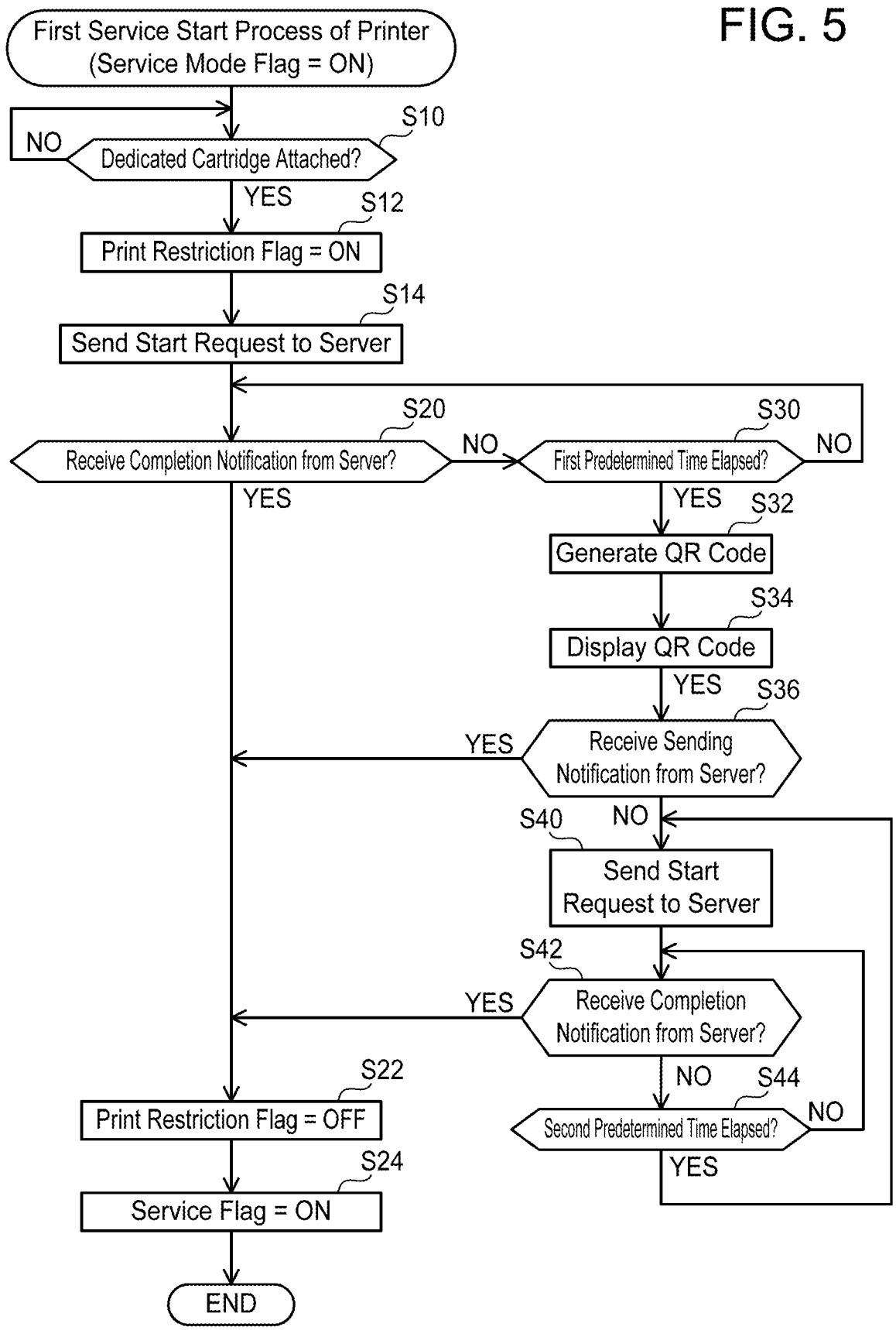
FIG. 5 shows a flowchart of a first service start process executed by a printer.

(First Service Start Process; FIG. 5)

Next, a first service start process executed by the CPU 32 of the printer 10 will be described with reference to FIG. 5. The CPU 32 starts the process of FIG. 5 in the case where the service mode flag 38 is changed from "OFF" to "ON".

In S10, the CPU 32 monitors whether the dedicated cartridge is attached to the print executing unit 20. The CPU 32 reads information stored in the cartridge attached to the print executing unit 20 and determines whether information indicating that the cartridge is a dedicated cartridge (termed "dedicated cartridge information" below) is included in the information. In a case where the dedicated cartridge information is included in the information that has been read, the CPU 32 determines YES in S10, and proceeds to S12.

In S12, the CPU 32 changes the print restriction flag 42 from "OFF" to "ON". Thereby, printing using the dedicated cartridge is restricted until the server 200 starts the flat-rate service.

In S14, the CPU 32 sends, to the server 200 via the Wi-Fi I/F 16, a start request for requesting the server 200 to start the flat-rate service. The start request includes start information. The start information includes the printer number PN1, the cartridge number of the dedicated cartridge attached to the print executing unit 20, the access token AT1, the number of printed sheets, and the remaining amount information.

In S20, the CPU 32 monitors whether a completion notification indicating that the flat-rate service had been started has been received from the server 200 via the Wi-Fi I/F 16. In a case where the completion notification is received from the server 200, the CPU 32 determines YES in S20, and proceeds to S22.

In S22, the CPU 32 changes the print restriction flag 42 from "ON" to "OFF". Thereby, the restriction on printing using the dedicated cartridge is released.

In S24, the CPU 32 changes the service flag 40 from "OFF" to "ON". In a case where the service flag 40 is "ON", the printer 10 sends notification information (i.e., printer number, cartridge number, access token, number of printed sheets, remaining amount information) to the server 200 each time a notification time (e.g., 12 hours) elapses. The notification time may be stored in advance in the memory 34 of the printer 10, or may be sent to the printer 10 from the server 200.

Further, simultaneously with the monitoring of S20, the CPU 32 monitors whether a first predetermined time has elapsed since the start request was sent to the server 200. In a case where the first predetermined time has elapsed since the start request was sent to the server 200, the CPU 32 determines YES in S30, and proceeds to S32. A case in which the first predetermined time elapses without receiving the completion notification after the start request was sent to the server 200 refers to, for example, a case in which the Wi-Fi I/F 16 of the printer 10 and the communication I/F 216 of the server 200 cannot communicate with each other, or a case in which the network setting of the printer 10 is not appropriate.

In S32, the CPU 32 generates a destination URL by using a URL 50 (http://server.com) for accessing the server 200, and a query string obtained by using the start information (i.e., printer number PN1, cartridge number of the dedicated cartridge, access token AT1, number of printed sheets, and remaining amount information). The CPU 32 generates the destination URL by adding the query string to the URL 50 (see T236 of FIG. 8). Next, the CPU 32 encodes the generated destination URL to generate a QR code.

In S34, the CPU 32 causes the display unit 14 to display the QR code generated in S32 and a message prompting the user to read the QR code. As will be described later, when the QR code is read by using the terminal device 100 (YES in S100 of FIG. 6) in a state where the QR code is being displayed on the display unit 14, a start request including the destination URL is sent from the terminal device 100 to the server 200 (S102).

In S36, the CPU 32 determines whether a sending notification indicating that the flat-rate service had started has been received from the terminal device 100 via the Wi-Fi I/F 16. In a case where the sending notification has been received from the terminal device 100 (YES in S36), the CPU 32 proceeds to S22. The case in which the sending notification has been received from the terminal device 100 means that the start request has been sent normally from the terminal device 100 to the server 200, and the server 200 has started the flat-rate service. On the other hand, in a case where the sending notification is not received from the terminal device 100 (NO in S36), the CPU 32 proceeds to S40. The case in which the sending notification is not received from the terminal device 100 refers to a case in which an error notification indicating that the sending of the start request from the terminal device 100 to the server 200 has failed, i.e., that the server 200 has not started the flat-rate service (see S124 of FIG. 6) is received.

S40, S42 are respectively the same as S14, S20. In S44, the CPU 32 monitors whether a second predetermined time (e.g., 30 minutes) has elapsed since the start request was sent to the server 200. In the present embodiment, the second predetermined time is a time longer than the first predetermined time. In a case where the second predetermined time has elapsed since the start request was sent to the server 200, the CPU 32 determines YES in S44, and returns to S40. The printer 10 executes the processes of S40 to S44 repeatedly until the completion notification is received from the server 200. As a result, in a case where the server 200 has not started the flat-rate service after the URL 50 and the query string 52 were outputted, the server 200 can start the flat-rate service without any operation by the user.

(Second Service Start Process)

Next, a second service start process executed by the CPU 132 of the terminal device 100 according to the service application 138 will be described with reference to FIG. 6. When the service application 138 is activated, the CPU 132 executes the process of FIG. 6.

In S100, the CPU 132 monitors whether the reading of the QR code displayed on the display unit 14 of the printer 10 has succeeded. The CPU 132 activates the camera 120, reads the QR code displayed on the display unit 14 of the printer 10, and decodes the QR code that has been read. In a case where the destination URL is obtained by decoding the QR code, the CPU 32 determines YES in S100, and proceeds to S102.

In S102, the CPU 132 sends a start request including the destination URL obtained in S100 to the server 200 via the cellular I/F 118.

In S110, the CPU 132 monitors whether the completion notification has been received from the server 200 via the cellular I/F 118. In a case where the completion notification has been received from the server 200, the CPU 132 determines YES in S110, and proceeds to S112.

In S112, the CPU 132 causes the display unit 114 to display a notification screen indicating that the completion notification from the server 200 has been received, i.e., that the sending of the start request to the server 200 has succeeded. Thereby, the user can acknowledge that the sending of the start request from the terminal device 100 to the server 200 has succeeded, and that the server 200 has started the flat-rate service.

In S114, the CPU 132 executes a communication with the printer 10 according to Simple Network Management Protocol (SNMP) via the Wi-Fi I/F 116 and the LAN 4 to send a sending notification to the printer 10. When S114 is completed, the CPU 132 ends the process of FIG. 6.

Further, simultaneously with the monitoring of S110, the CPU 132 monitors in S120 whether a third predetermined time (e.g., 5 seconds) has elapsed since the start request was sent to the server 200. In a case where the third predetermined time has elapsed since the start request was sent to the server 200, the CPU 32 determines YES in S120, and proceeds to S122.

In S122, the CPU 132 causes the display unit 114 to display an error screen indicating that the sending of the start request to the server 200 has failed.

In S124, the CPU 132 executes a communication according to SNMP with the printer 10 via the Wi-Fi I/F 116 and the LAN 4 to send an error notification to the printer 10. When S124 is completed, the CPU 132 ends the process of FIG. 6.

Figure 7:
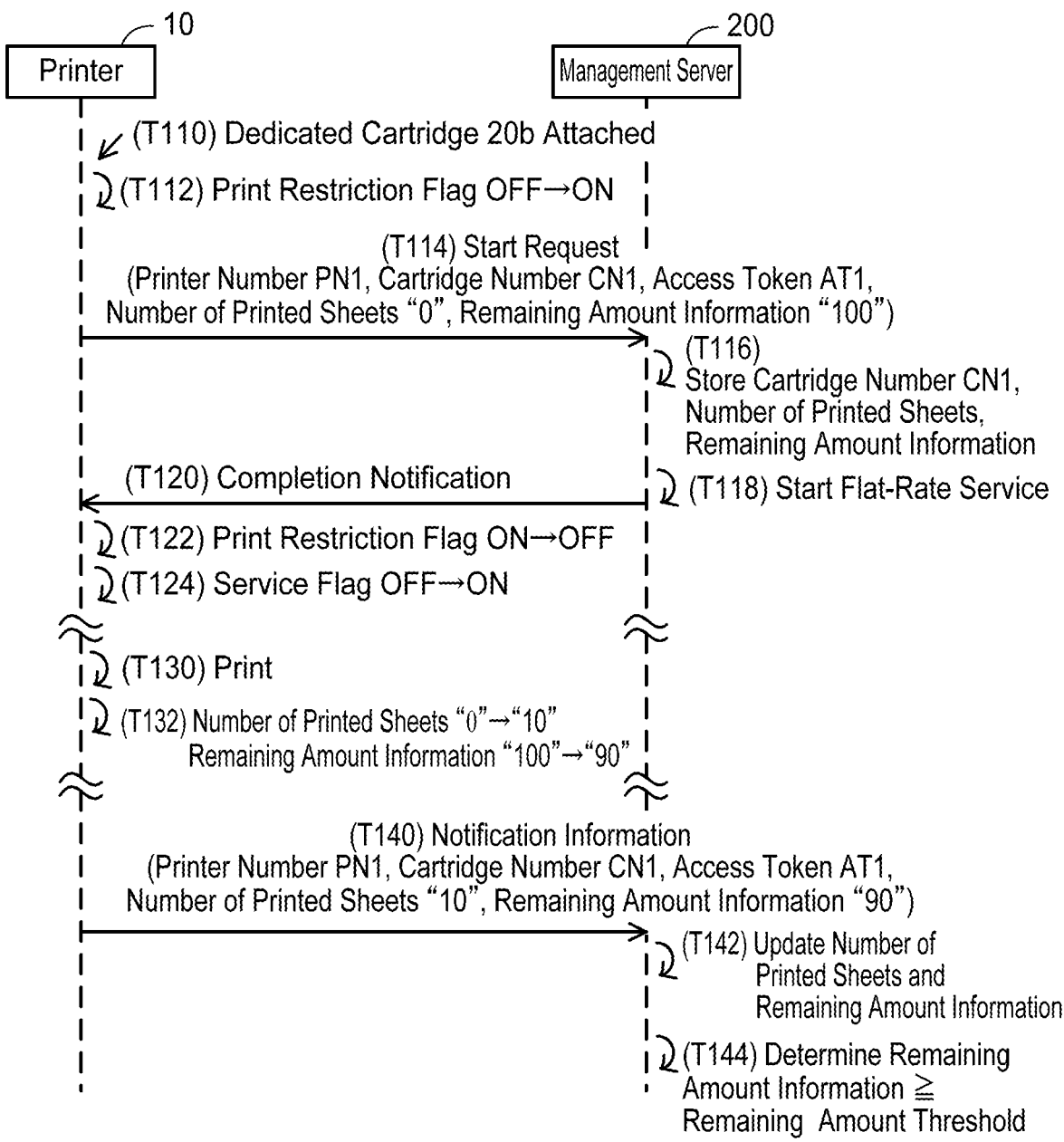
FIG. 7 shows a sequence diagram of a case A in which a server starts service due to a start request sent from the printer.
Figure 8:
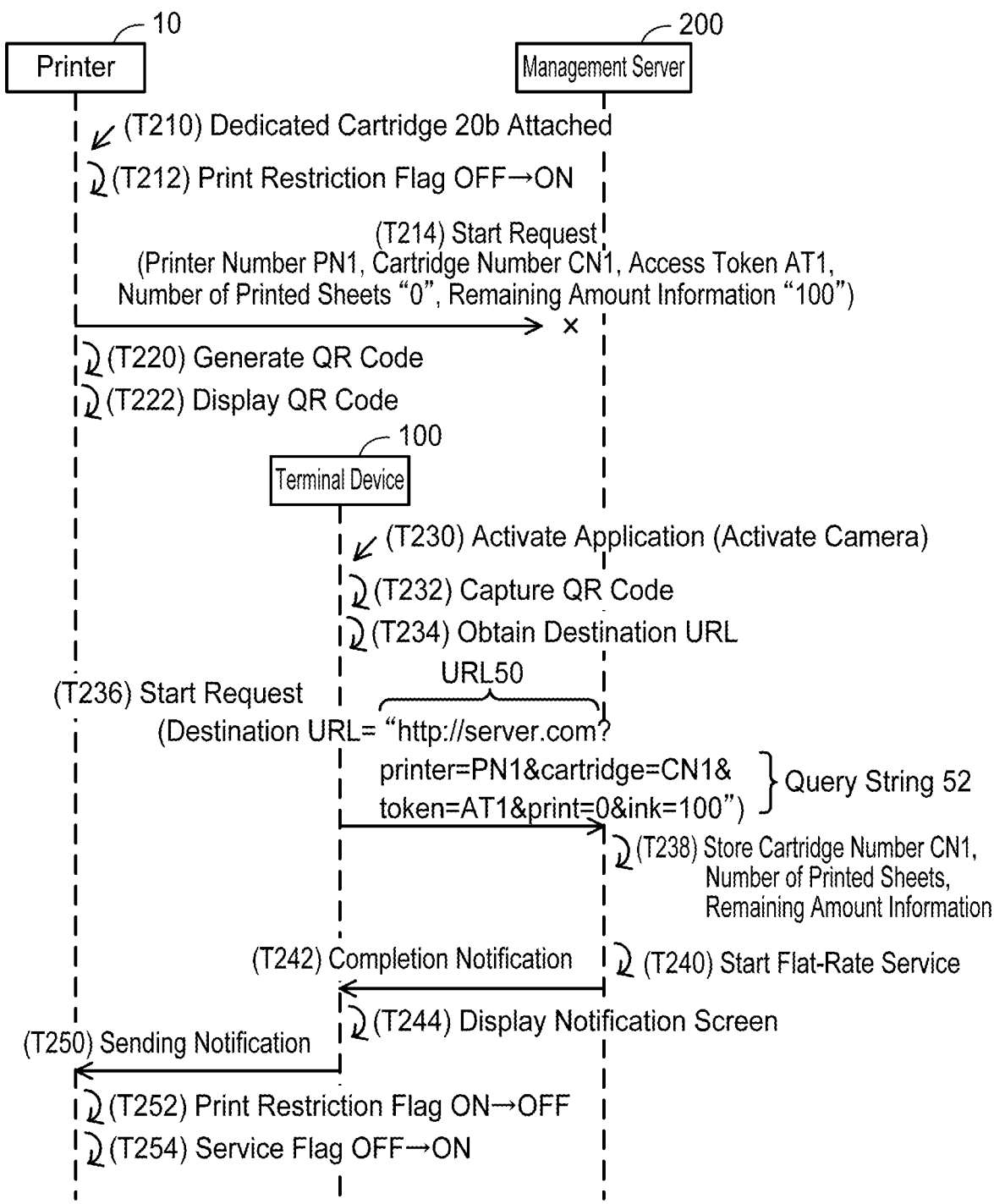
FIG. 8 shows a sequence diagram of a case B in which the server starts a service due to a start request sent from the terminal device.

(Specific Cases; FIGS. 7 and 8)

Next, specific cases realized by the processes of FIGS. 5 and 6 will be described with reference to FIGS. 7 and 8. In FIGS. 7 and 8, to facilitate understanding, processes executed by the CPU of each device (e.g., the CPU 32 of the printer 10, etc.) are described with each device (e.g., the printer 10, etc.) as the subject of the processes, not with the CPU described as the subject thereof.

(Case A; FIG. 7)

A case A, in which the start request has been successfully sent from the printer 10 to the server 200 and the server 200 thereby starts the flat-rate service, will be described with reference to FIG. 7. An initial state of case A is a state after the service preparation process of FIGS. 3 and 4 has been completed. Consequently, the user name UN, the printer number PN1, and the access token AT1 are stored in association with one another in the service table 240 of the server 200. Further, this is a state after the user of the printer 10 received the dedicated cartridge 20b shipped in T82 of FIG. 4.

When the dedicated cartridge 20b is attached to the print executing unit 20 in T110, the printer 10 reads the information stored in the dedicated cartridge 20b, determines that the dedicated cartridge information is included in the information that has been read, and determines that the cartridge attached to the print executing unit 20 is a dedicated cartridge (YES in S10 of FIG. 5). Next, the printer 10 changes the print restriction flag 42 from "OFF" to "ON" in T112 (S12), and, sends to the server 200 a start request including printer number PN1, cartridge number CN1, access token AT1, number of printed sheets "0", and remaining amount information "100" via the Wi-Fi I/F 16 in T114 (S14). Thus, when the printer 10 determines that the dedicated cartridge 20b has been attached to the print executing unit 20, the printer 10 sends the start request to the server 200. That is, the user only needs to attach the dedicated cartridge 20b to the print executing unit 20. Consequently, user convenience can be improved.

When receiving the start request from the printer 10 via the communication I/F 216 in T114, the server 200 determines that the access token AT1 in the start request matches the access token AT1 in the service table 240, i.e., determines that authentication has succeeded, and stores in the service table 240 the cartridge number CN1, number of printed sheets "0", and remaining amount information "100" in the start request in association with the access token AT1 in T116. Since the cartridge number CN1 is included in the start request, the server 200 can acknowledge the cartridge number used in the flat-rate service. Next, the server 200 starts the flat-rate service in T118. Specifically, the server 200 acknowledges a current date as the service start date. Next, in T120 the server 200 sends, to the printer 10, a completion notification indicating that the flat-rate service has been started via the communication I/F 216.

When receiving the completion notification from the server 200 via the Wi-Fi I/F 16 in T120 (YES in S20), the printer 10 changes the print restriction flag 42 from "ON" to "OFF" in T122 (S22), and changes the service flag 40 from "OFF" to "ON" in T124 (S24).

Then, when the printer 10 executes printing using the dedicated cartridge 20b in T130, the printer 10 calculates the number of sheets of printing paper "10" and an amount of ink in the dedicated cartridge 20b "10" used in this printing, and updates the number of printed sheets in the memory 34 from "0" to "10", and updates the remaining amount information from "100" to "90" in T132.

When determining that the notification time (e.g., 12 hours) has elapsed since receiving the completion notification in T120, the printer 10 identifies the number of printed sheets "10" and the remaining amount information "90" in the memory 34, and sends notification information including the printer number PN1, the cartridge number CN1, the access token AT1, the number of printed sheets "10", and the remaining amount information "90" to the server 200 via the Wi-Fi I/F 16 in T140.

When receiving the notification information from the printer 10 via the communication I/F 216 in T140, the server 200 determines that the access token AT1 in the notification information matches the access token AT1 in the service table 240, and uses the number of printed sheets and the remaining amount information in the notification information to update the number of printed sheets and the remaining amount information associated with the access token AT1 in the service table 240 in T142. Further, in T144, the server 200 determines that the remaining amount information in the notification information is equal to or above a shipping threshold (e.g., "25"). The shipping threshold is a threshold for determining whether to ship a new dedicated cartridge. The server 200 ships a new dedicated cartridge in a case where the remaining amount information in the notification information is less than the shipping threshold (e.g., "25"). Thereafter, the printer 10 transmits the notification information to the server 200 each time the notification time elapses. Then, when a predetermined period (e.g., one month) from the service start date (see T118) has elapsed, the server 200 determines whether the number of printed sheets in the predetermined period is less than or equal to the predetermined number of sheets. The server 200 charges the user of the printer 10 the predetermined amount of money in a case where the number of printed sheets in the predetermined period is less than or equal to the predetermined number of sheets, while in a case where the number of printed sheets in the predetermined period exceeds the predetermined number of sheets, the server 200 determines an additional amount of money corresponding to the number of sheets exceeding the predetermined number of sheets, and charges the user of the printer 10 an amount of money that is the sum of the predetermined amount of money and the additional amount of money.

(Case B; FIG. 8)

With reference to FIG. 8, a case B in which the sending of the start request from the printer 10 to the server 200 fails will be described. An initial state of case B is the same as the initial state of case A.

T210, T212 are respectively the same as T110, T112 of FIG. 7. In T214, the printer 10 sends a start request including the printer number PN1, the cartridge number CN1, the access token AT1, the number of printed sheets "0", and the remaining amount information "100" to the server 200 via the Wi-Fi I/F 16 (S14 of FIG. 5). In the present case, since the Wi-Fi I/F 16 of the printer 10 and the communication I/F 216 of the server 200 cannot communicate with each other, the sending of the start request from the printer 10 to the server 200 fails. When the first predetermined time has elapsed since the start request was sent to the server 200 (YES in S30), the printer 10 generates a QR code (S32) in T220. First, the printer 10 generates a destination URL including the URL 50 (http://server.com) for accessing the server 200, and a query string 52 (printer=PN1&cartridge=CN2&token=AT1&print=0&ink=100). The query string 52 is a character string described in a query part of the destination URL (i.e., the part after the character "?"), and is a character string indicating the printer number, the cartridge number, the access token, the number of printed sheets, and the remaining amount information. Next, the printer 10 generates a QR code by encoding the generated destination URL and, in T222, displays the generated QR code and a message prompting the user to read the QR code (S34).

Next, when accepting an activation operation of the service application 138 in T230 from the user, the terminal device 100 activates the service application 138, and further activates the camera 120. Next, in T232, the terminal device 100 uses the camera 120 to capture the QR code displayed on the display unit 14 of the printer 10 (see T222). Next, when the terminal device 100 has decoded the captured QR code and obtained the destination URL including the URL 50 and the query string 52 in T234, the terminal device 100 determines that reading of the QR code has succeeded (YES in S100 of FIG. 6). Next, in T236, the terminal device 100 sends a start request including the destination URL to the server 200 via the cellular I/F 118 (S102). Thus, merely by executing the operation for reading the QR code, the user can cause the terminal device 100 to send the start request to the server 200.

When receiving the start request from the terminal device 100 via the communication I/F 216 in T236, the server 200 extracts, as the query string 52, the character string described after "?" in the destination URL in the start request. The server 200 further extracts the printer number PN1, the cartridge number CN1, the access token AT1, the number of printed sheets "0", and the remaining amount information "100" from the query string 52. Next, the server 200 determines whether the extracted access token AT1 matches the access token AT1 in the service table 240. T238 is the same as T116 of FIG. 7 except that the extracted cartridge number CN1, the extracted number of printed sheets "0", and the extracted remaining amount information "100" are used. T240 is the same as T118. In T242, the server 200 sends a completion notification to the terminal device 100 via the communication I/F 216.

When receiving the completion notification from the server 200 via the cellular I/F 118 in T242 (YES in S110), the terminal device 100 displays a notification screen in T244 (S112). Next, the terminal device 100 sends a sending notification to the printer 10 via the Wi-Fi I/F 116 and the LAN 4 in T250 (S114) (YES in S36 of FIG. 5). T252, T254 are respectively the same as T122, T124 of FIG. 7. This allows the server 200 to start the flat-rate service by using the terminal device 100 even when the start request cannot be sent from the printer 10 to the server 200.

(Effect of Present Embodiment)

The printer 10 sends the start request including the access token AT1 and the number of printed sheets to the server 200 (T114 of FIG. 7). As a result, the server 200 uses the start request to start the flat-rate service (T118). Further, in the case where the start request including the access token AT1 and the number of printed sheets cannot be sent to the server 200 (T214 of FIG. 8), the printer 10 outputs the URL 50 and the query string 52 that can be obtained by using the access token AT1 and the number of printed sheets (T222). When obtaining the URL 50 and the query string 52, the terminal device 100 uses the URL 50 to send the query string 52 including the access token AT1 and the number of printed sheets to the server 200 (T236). As a result, the server 200 uses the query string 52 to start the flat-rate service (T240). Consequently, even when the access token AT1 and the number of printed sheets cannot be sent from the printer 10 to the server 200, it is possible to cause the server 200 to start the charging service.

In the present embodiment, in particular, from the time when the dedicated cartridge 20b is attached to the print executing unit 20 of the printer 10 until the start request is sent to the server 200, i.e., until the server 200 starts the flat-rate service, the execution of printing by the print executing unit 20 is restricted. For this reason, in a case where the printer 10 does not output the URL 50 or the query string 52 including the access token AT1 and the number of printed sheets under a situation where the access token AT1 and the number of printed sheets cannot be sent from the printer 10 to the server 200, the user cannot execute printing using the printer 10. Therefore, in the present embodiment, in a case where the start request including the access token AT1 and the number of printed sheets cannot be sent to the server 200 (T214 of FIG. 8), the printer 10 outputs the URL 50 and the query string 52 including the access token AT1 and the number of printed sheets (T222). Then, in a case where the query string 52 including the access token AT1 and the number of printed sheets is sent to the server 200 by using the URL 50 (T236), the terminal device 100 sends the sending notification to the printer 10 (T242). In a case of receiving the sending notification from the terminal device 100 (T250), the printer 10 changes the print restriction flag 42 from "ON" to "OFF" (T252). Thereby, the restriction on printing using the print executing unit 20 is released. Consequently, even when the access token AT1 and the number of printed sheets cannot be sent from the printer 10 to the server 200, it becomes possible for the user to execute printing using the printer 10.

(Correspondence Relationship)

The attachment of the dedicated cartridge 20b to the print executing unit 20 is an example of "predetermined operation". The process of sending the start request from the printer 10 to the server 200 of S14 of FIG. 5 is an example of "communication process". The charging service is an example of "service related to the printer". The printer number PN1, the cartridge number CN1, the access token AT1, and the number of printed sheets are examples of "start information". The display unit 14 of the printer 10 is an example of "output unit". The URL 50 is an example of "communication information". The query string 52 is an example of "start related information". The process of causing the display unit 14 of the printer 10 to display the QR code is an example of "output process".

The attachment of the dedicated cartridge 20b to the print executing unit 20 is an example of "first predetermined operation". The Wi-Fi I/F 16, the display unit 14 of the printer 10 are an example of "network interface", "output unit", respectively. The printer number, the cartridge number are an example of "printer identification information", "cartridge identification information", respectively.

The process executed in S14 of FIG. 5 is an example of "execute a communication process". The process executed in S34 of FIG. 5 is an example of "execute an output process" executed by "output process executing unit". The process executed in S100 of FIG. 6 is an example of "obtain the communication information and the start related information". The process executed in S102 of FIG. 6 is an example of "send the start related information".

Second Embodiment

Next, a second embodiment will be described. In the present embodiment, the CPU 32 of the printer 10 executes the process of FIG. 9 instead of the process of FIG. 5.

Figure 9:
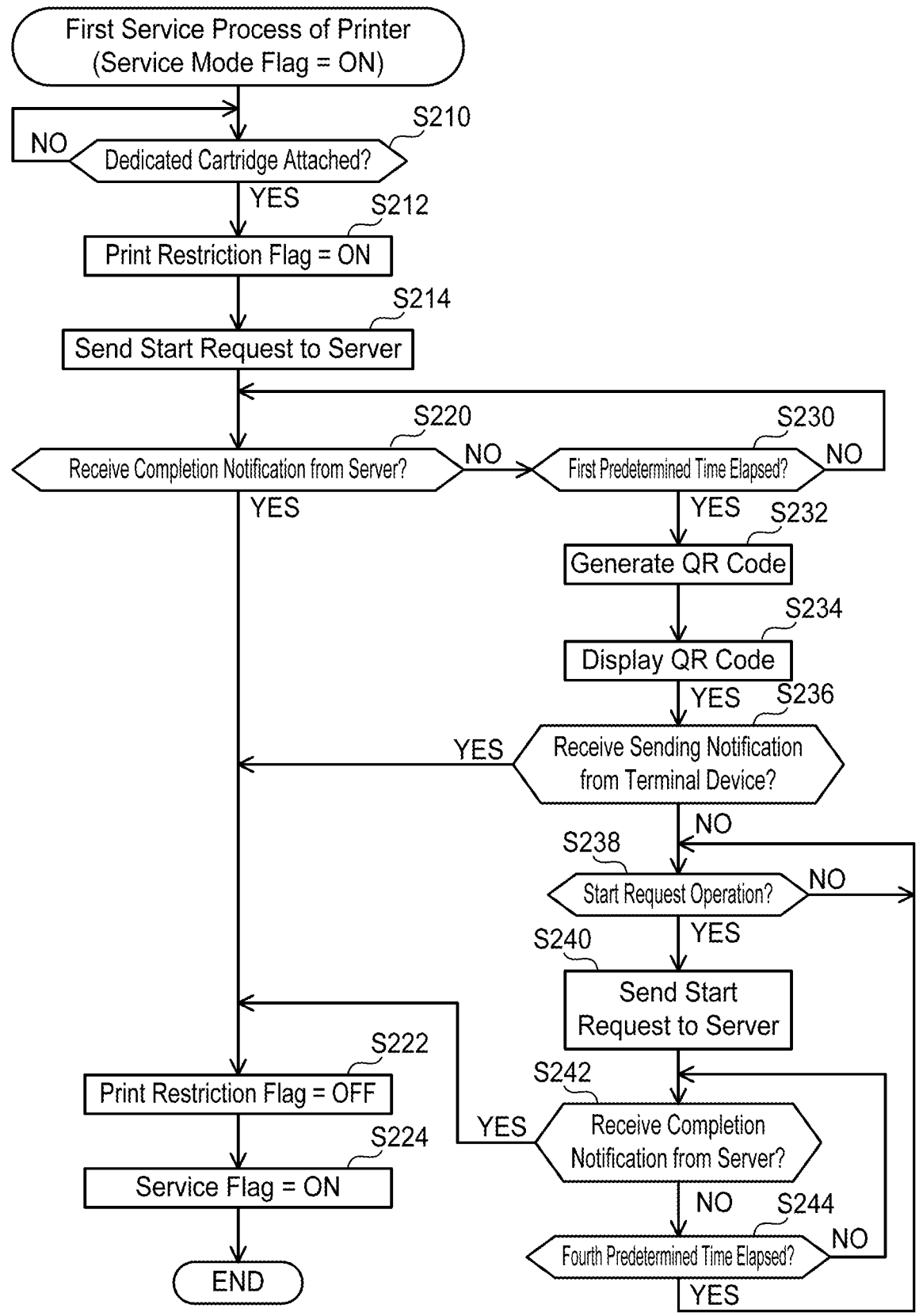
FIG. 9 shows a flowchart of a first service start process of a second embodiment.

(First Service Start Process; FIG. 9)

A first service start process executed by the CPU 32 of the printer 10 will be described with reference to FIG. 9. S210 to S236 are the same as S10 to S36 of FIG. 5.

In S238, the CPU 32 starts accepting a start request operation. The start request operation is an operation for requesting sending of a start request to the server 200. In the case of accepting the start request operation, the CPU 32 determines YES in S238, and proceeds to S240. S240, S242 are respectively the same as S40, S42 of FIG. 5. In S244, the CPU 32 monitors whether a fourth predetermined time (e.g., 30 minutes) has elapsed. In the case where the fourth predetermined time has elapsed since the start request was sent to the server 200, the CPU 32 determines YES in S244, and returns to S238. According to the aforementioned configuration, in the case where the server 200 has not started the flat-rate service after the URL 50 and the query string 52 were output, the user of the printer 10 can cause the server 200 to start the flat-rate service by performing the start request operation.

(Correspondence Relationship)

The start request operation of FIG. 9 is an example of "second predetermined operation".

Figure 10:
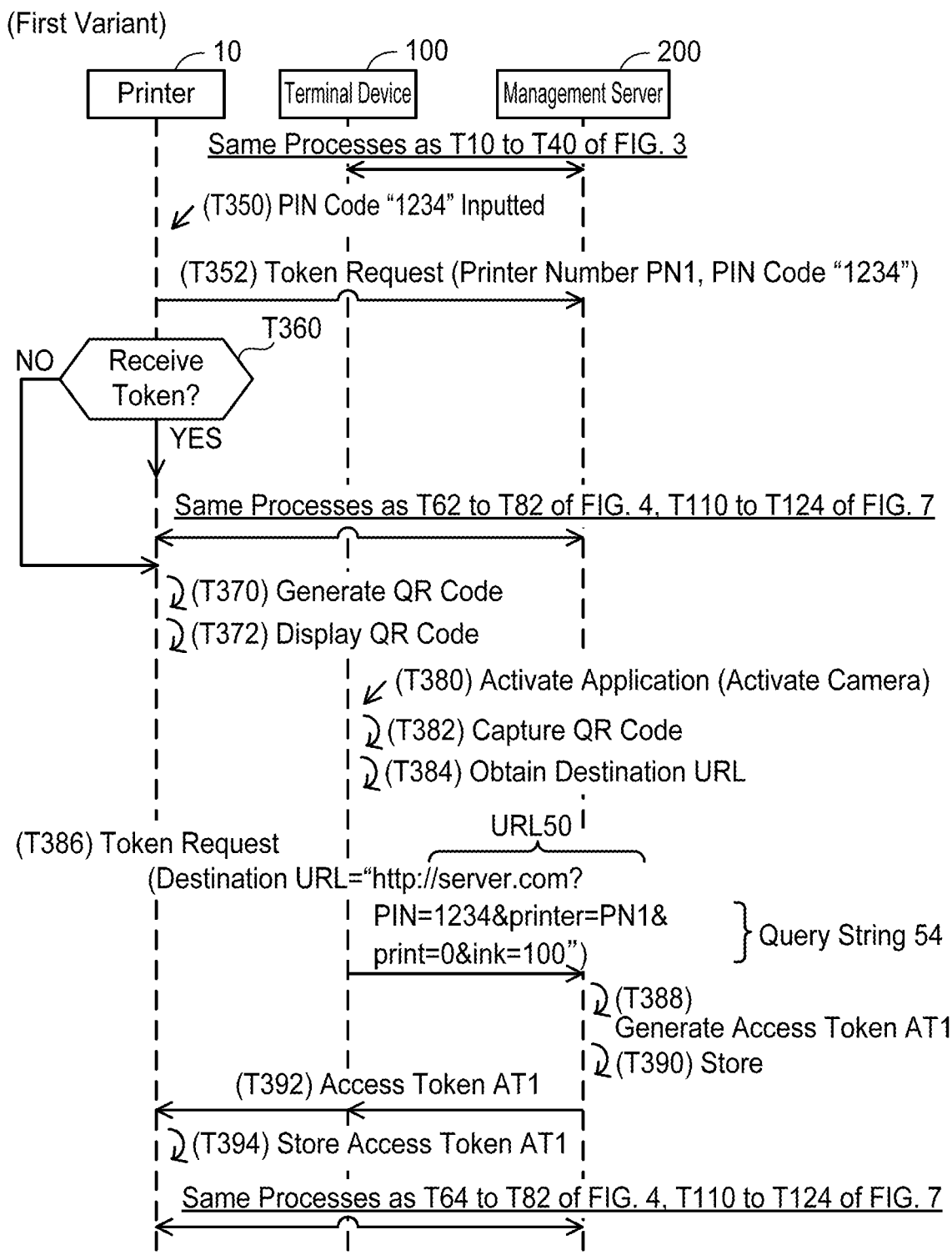
FIG. 10 shows a sequence diagram of a service start process of a first variant.

(First Variant) The timing at which the QR code is displayed on the display unit 14 of the printer 10 is not limited to the timing at which the sending of the start request from the printer 10 to the server 200 failed. For example, the QR code may be displayed on the display unit 14 of the printer 10 in a case where the sending of the PIN code from the printer 10 to the server 200 fails. A specific case realized by this variant will be described with reference to FIG. 10.

First, the same processes as in T10 to T40 of FIG. 3 are executed between the terminal device 100 and the server 200. T350, T352 are respectively the same as T50, 52. After sending a token request to the server 200 in T352, the printer 10 determines whether an access token has been received from the server 200 in T360. When the sending of the token request from the printer 10 to the server 200 succeeds, the same processes as in T54 to T58 of FIG. 3 and T60 of FIG. 4 are executed between the printer 10 and the server 200. In this case, since the printer 10 receives the access token AT1 from the server 200, the printer 10 determines YES in T360.

Thereafter, the same processes as in T62 to T82 of FIG. 4 and T110 to T124 of FIG. 7 are executed between the printer 10 and the server 200, and the server 200 starts the flat-rate service.

On the other hand, in a case where the Wi-Fi I/F 16 of the printer 10 and the communication I/F 216 of the server 200 cannot communicate with each other, the sending of the token request from the printer 10 to the server 200 fails. In this case, since the printer 10 does not receive the access token AT1 from the server 200, the printer 10 determines NO in T360 and generates a QR code in T370. The printer 10 generates a destination URL including the URL 50 (http://server.com) for accessing the server 200, and a query string 54 (PIN=1234&printer=PN1&print=0&ink=100). The query string 54 includes the PIN code "1234", the printer number PN1, the number of printed sheets "0", and the remaining amount information "100". Next, the printer 10 generates the QR code by encoding the generated destination URL and, displays the generated QR code in T372.

T380 to T384 are the same as T230 to T234 of FIG. 8. Next, in T386 the terminal device 100 sends a token request including the obtained destination URL to the server 200 via the cellular I/F 118.

When receiving the token request from the terminal device 100 via the communication I/F 216 in T386, the server 200 extracts, as the query string 54, the character string described after "?" in the destination URL in the token request. Then, the server 200 further extracts the PIN code "1234", the printer number PN1, the number of printed sheets "0", and the remaining amount information "100" from the query string 54. Next, the server 200 determines that authentication of the extracted PIN code "1234" has succeeded, generates the access token AT1 in T388 and, in T390, stores the user name UN associated with the PIN code "1234", the printer number PN1 included in the token request, and the generated access token AT1 in association with one another in the service table 240. Next, in T392 the server 200 sends the access token AT1 to the terminal device 100 via the communication I/F 216.

When receiving the access token AT1 from the server 200 via the cellular I/F 118 in T392, the terminal device 100 executes a communication according to SNMP with the printer 10 via the Wi-Fi I/F 116 and the LAN 4, and sends the access token AT1 to the printer 10. T394 is the same as T62 of FIG. 4. Thereafter, when the Wi-Fi I/F 16 of the printer 10 and the communication I/F 216 of the management server 200 reach a state of being able to communicate with each other, the same processes as in T64 to T82 of FIG. 4, and T110 to T124 of FIG. 7 are executed between the printer 10 and to the server 200, and the server 200 starts the flat-rate service. According to the present variant also, the same effect can be achieved as with the first and second embodiments. In the present variant, the PIN code 1234 and the printer number PN1 are examples of "start information". Further, the query string 54 including the PIN code 1234 and the printer number PN1 is an example of "start related information".

(Second Variant) In the aforementioned embodiments, a text included in the start request of T214 of FIG. 8, and a text included in the query string 52 of the destination URL are different. For example, the query string 52 includes "&", whereas the start request of T214 does not include "&". That is, in the aforementioned embodiments, "start related information" indicates the same information as the information included in "start information", but includes pieces of information showing a different character string. However, in a variant, the query string included in the destination URL may include the same text as the text included in the start request of T214. In the present variant, "start related information" is the same as "start information". In the present variant, also, "start related information" is information that can be obtained by using "start information".

Figure 6:
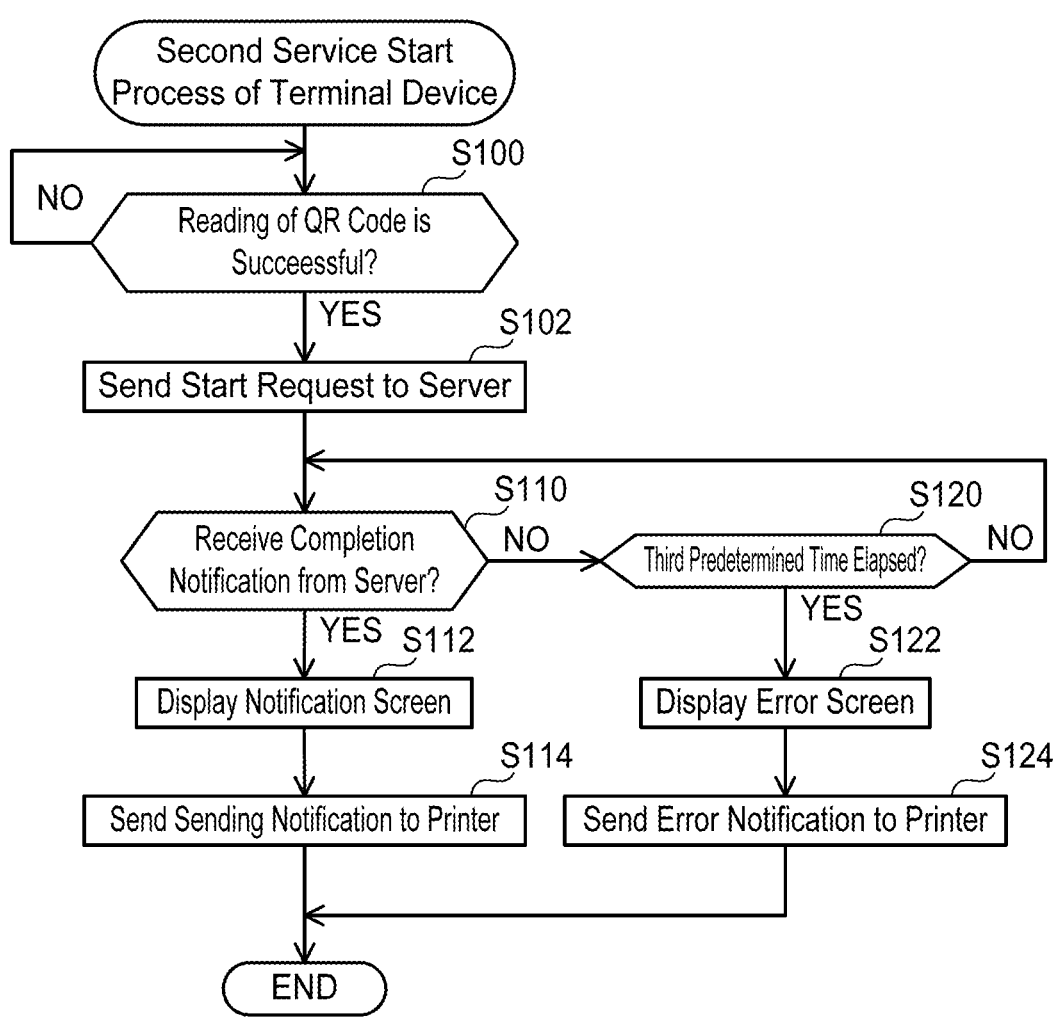
FIG. 6 shows a flowchart of a second service start process executed by a terminal device.

(Third Variant) S110 to S124 of FIG. 6 may be omitted. In the present variant, "receive from the server a completion notification", "display a notification screen" may be omitted.

(Fourth Variant) "Output unit" is not limited to the display unit 14, but may be the Wi-Fi I/F 16, the print executing unit 20, a Near Field Communication (NFC) I/F, a Bluetooth (registered trademark) I/F, etc. For example, the printer 10 may execute a communication according to SNMP with the terminal device 100 via the Wi-Fi I/F 16 and the LAN 4 to send the destination URL generated in S32 of FIG. 5 to the terminal device 100. Further, for example, the printer 10 may cause the print executing unit 20 to print the QR code generated in S32 of FIG. 5. Further, for example, the printer 10 may cause a memory of the NFC I/F to store the destination URL generated in S32.

(Fifth Variant) In S10 of FIG. 5, the printer 10 may monitor whether operation of the operation unit 12 of the printer 10 has been accepted. The operation of the operation unit 12 of the printer 10 is, e.g., operation of an online button, etc. In the present variant, operation of the operation unit 12 of the printer 10 is an example of "predetermined operation" and "first predetermined operation".

(Sixth Variant) The start information to be sent from the printer 10 to the server 200 may include at least one of printer number and cartridge number. Further, the start information may not include the remaining amount information.

(Seventh Variant) "Service related to a printer" is not limited to the charging service that charges in accordance with the number of printed sheets of the printer 10. For example, it may be an automatic ordering service in which, when a remaining amount of a consumable of the printer 10 (e.g., a remaining amount of a cartridge) is equal to or below a threshold, the consumable is ordered automatically. Further, it may for example be an ordering service in which a consumable is ordered to a user in response to an instruction from the user to order the consumable.

(Eighth Variant) In the aforementioned embodiments, the printer 10 determines whether the cartridge attached to the print executing unit 20 is a dedicated cartridge. Instead of this, the server 200 may determine whether the cartridge attached to the print executing unit 20 is a dedicated cartridge. In the present variant, in a case where a cartridge is attached to the print executing unit 20 in the state where the service mode flag 38 is "ON", the printer 10 sends a start request including the cartridge number of this cartridge to the server 200. When receiving the start request from the printer 10, the server 200 determines whether the cartridge number in the start request is a cartridge number corresponding to a dedicated cartridge. Then, in a case where the cartridge number in the start request is a cartridge number corresponding to a dedicated cartridge, the server 200 sends a completion notification to the printer 10, and starts the flat-rate service. On the other hand, in a case where the cartridge number in the start request is not a cartridge number corresponding to a dedicated cartridge, the server 200 sends an error notification to the printer 10, and does not start the flat-rate service.

(Ninth Variant) The server 200 may send, to the printer 10, the cartridge number CN1 assigned to the shipped dedicated cartridge 20a after T82 of FIG. 4. In the present variant, when receiving the cartridge number CN1 from the server 200, the printer 10 stores the cartridge number CN1 in the memory 34. In the present variant, the CPU 32 of the printer 10 reads the cartridge number assigned to the cartridge attached to the print executing unit 20 in S10 of FIG. 5, and determines whether the cartridge number that has been read and the cartridge number received from the server 200 (e.g., the cartridge number CN1) match. Then, in a case where the cartridge numbers match, the CPU 32 determines YES in S10, and proceeds to S12.

(Tenth Variant) The print restriction flag 42 may not be stored in the memory 34 of the printer 10. In the present variant, S12, S22 of FIG. 5 may be omitted. In the present variant, even if the server 200 has not started the flat-rate service in a state where the dedicated cartridge is attached to the print executing unit 20 of the printer 10, the execution of printing using the dedicated cartridge is not restricted. In the present variant, the CPU 32 of the printer 10 stores the number of printed sheets that were printed using the dedicated cartridge after the dedicated cartridge was attached to the print executing unit 20. Then, the printer 10 sends, to the server 200, a start request including the number of printed sheets that were printed using the dedicated cartridge. In the present variant, "restrict execution of printing", "receive from terminal device a sending notification", "release the restriction of the execution of printing" may be omitted.

(Eleventh Variant) In the aforementioned embodiments, the server 200 stores the number of printed sheets and the remaining amount information received from the printer 10, and also executes shipping of the cartridge. In a variant, a server that stores the number of printed sheets and the remaining amount information received from the printer 10 and a server that executes shipping of the cartridge may be separate servers.

(Twelfth Variant) In the aforementioned embodiments, the respective processes of FIG. 3 to FIG. 10 are implemented by software (e.g., the programs 36, 136, 236), however, one or more of the processes may be implemented by hardware such as a logic circuit.

What is claimed is:
1. A communication system comprising:
   a printer; and
   a terminal device,
   wherein the printer comprises:
      an output unit; and
      a controller configured to:
      in a case where a predetermined operation is accepted, execute a communication process, the communication process including a process for sending start information to a server, the start information including cartridge identification information identifying a cartridge housing a color material for printing and attached to the printer, the cartridge being used in a service related to printing, and the start information being for causing the server to start the service; and
      in a case where sending of the start information to the server fails in the communication process, execute an output process for causing the output unit to output communication information for communicating with the server and start related information obtained by using the start information,
   wherein the terminal device comprises:
      a controller configured to:
      obtain the communication information and the start related information outputted by the printer; and in a case where the communication information and the start related information are obtained, send the start related information to the server using the communication information, wherein the controller of the printer is further configured to:

in a case where the start related information has been sent from the terminal device to the server, execute a specific process for starting the service.

2. The communication system as in claim 1, wherein the terminal device further comprises a display unit, wherein the controller of the terminal device is further configured to:

after the start related information has been sent to the server, receive from the server a completion notification indicating that the service has been started; and display a notification screen indicating that the completion notification has been received on the display unit of the terminal device.

3. A printer comprising:

an output unit; and a controller configured to:

in a case where a first predetermined operation is accepted, execute a communication process, the communication process including a process for sending start information to a server, the start information including cartridge identification information identifying a cartridge housing a color material for printing and attached to the printer, the cartridge being used in a service related to printing, and the start information being for causing the server to start the service; and in a case where sending of the start information to the server fails in the communication process, execute an output process for causing the output unit to output communication information for communicating with the server and start related information obtained by using the start information; and in a case where the sending of the start information to the server fails in the communication process and a terminal device sends to the server the start related information outputted by the printer using the communication information outputted from the printer, execute a specific process for starting the service.

4. The printer as in claim 3, further comprising:

a network interface, wherein the communication process includes the process for sending the start information to the server via the network interface, and the output unit is hardware different from the network interface.

5. The printer as in claim 3, wherein the output unit is a display unit, and the output process includes a process for displaying on the display unit a coded image in which the communication information and the start related information are coded.

6. The printer as in claim 3, further comprising:

a print executing unit, wherein the first predetermined operation is an operation of attaching the cartridge to the print executing unit.

7. The printer as in claim 3, wherein the start information further includes printer identification information identifying the printer.

8. The printer as in claim 3, wherein the service is a charging service that charges in accordance with a number of sheets printed by the printer.

9. The printer as in claim 3, wherein the controller is further configured to:

after the output process has been executed, re-execute the communication process even though the first predetermined operation is not re-accepted.

10. The printer as in claim 3, wherein the controller is further configured to:

in a case where a second predetermined operation is accepted after the output process has been executed, re-execute the communication process.

11. The printer as in claim 3, wherein the controller is further configured to:

between acceptance of the first predetermined operation and the sending of the start information to the server, restrict execution of printing;

in the case where the sending of the start information to the server fails in the communication process and a terminal device sends to the server the start related information outputted by the printer using the communication information outputted from the printer, receive from the terminal device a sending notification indicating that the start related information has been sent to the server; and in a case where the sending notification is received, release the restriction of the execution of printing.

12. A method executed by a communication system comprising a printer and a terminal device, the method comprising:

in a case where a predetermined operation is accepted, executing by the printer a communication process, the communication process including a process for sending start information from the printer to a server, the start information including cartridge identification information identifying a cartridge housing a color material for printing and attached to the printer, the cartridge being used in a service related to printing, and the start information being for causing the server to start the service; and in a case where sending of the start information to the server fails in the communication process, executing by the printer an output process for causing an output unit of the printer to output communication information for communicating with the server and start related information obtained by using the start information, wherein the method executed by the communication system further comprising:

obtaining by the terminal device the communication information and the start related information outputted by the printer; and in a case where the communication information and the start related information are obtained, sending by the terminal device the start related information to the server using the communication information, wherein the method executed by the communication system further comprises:

in a case where the start related information has been sent from the terminal device to the server, executing by the printer a specific process for starting the service.

13. The method as in claim 12, further comprising after the start related information has been sent to the server, receiving, by the terminal device, from the server a completion notification indicating that the service has been started; and displaying by the terminal device a notification screen indicating that the completion notification has been received on a display unit of the terminal device.

14. A non-transitory computer-readable recording medium storing computer-readable instructions for a printer, the computer-readable instructions, when executed by a processor of the printer, causing the printer to:

in a case where a first predetermined operation is accepted, execute a communication process, the communication process including a process for sending start information to a server, the start information including cartridge identification information identifying a cartridge housing a color material for printing and attached to the printer, the cartridge being used in a service related to printing, and the start information being for causing the server to start the service; and in a case where sending of the start information to the server fails in the communication process, execute an output process for causing an output unit of the printer to output communication information for communicating with the server and start related information obtained by using the start information; and in a case where the sending of the start information to the server fails in the communication process and a terminal device sends to the server the start related information outputted by the printer using the communication information outputted from the printer, execute a specific process for starting the service.

15. The non-transitory computer-readable recording medium as in claim 14, wherein
the communication process includes the process for sending the start information to the server via a network interface of the printer, and
the output unit is hardware different from the network interface.

16. The non-transitory computer-readable recording medium as in claim 14, wherein
the output unit is a display unit, and
the output process includes a process for displaying on the display unit a coded image in which the communication information and the start related information are coded.

17. The non-transitory computer-readable recording medium as in claim 14, wherein
the first predetermined operation is an operation of attaching the cartridge to a print executing unit of the printer.

18. The non-transitory computer-readable recording medium as in claim 14, wherein
the start information further includes printer identification information identifying the printer.

19. The non-transitory computer-readable recording medium as in claim 14, wherein
the service is a charging service that charges in accordance with a number of sheets printed by the printer.

20. The non-transitory computer-readable recording medium as in claim 14, wherein
the computer-readable instructions further causing the printer to:
after the output process has been executed, re-execute the communication process even though the first predetermined operation is not re-accepted.

* * * * *